March 12, 1940. E. BLATTMANN 2,193,547
GUN MOUNT FOR VEHICLES OR AIRCRAFT
Filed April 7, 1937 5 Sheets-Sheet 1
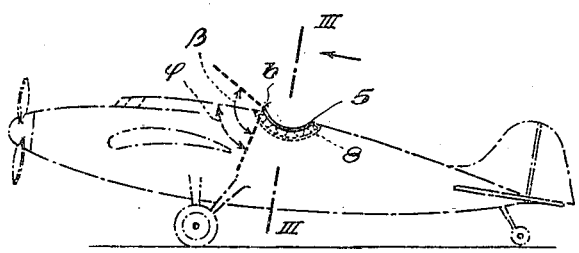
Fig. 1
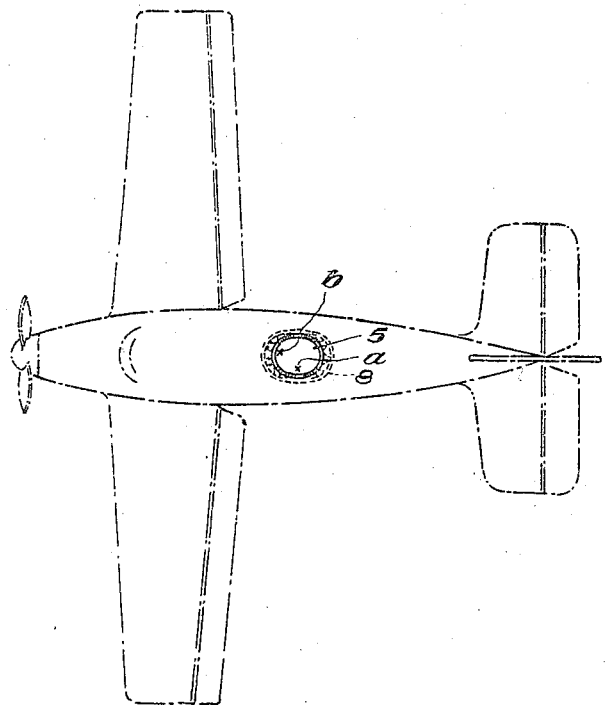
Fig. 2
Fig. 3
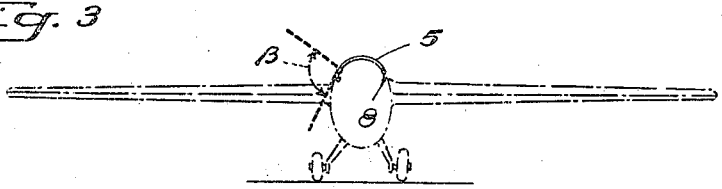

March 12, 1940. E. BLATTMANN 2,193,547
GUN MOUNT FOR VEHICLES OR AIRCRAFT
Filed April 7, 1937 5 Sheets-Sheet 2
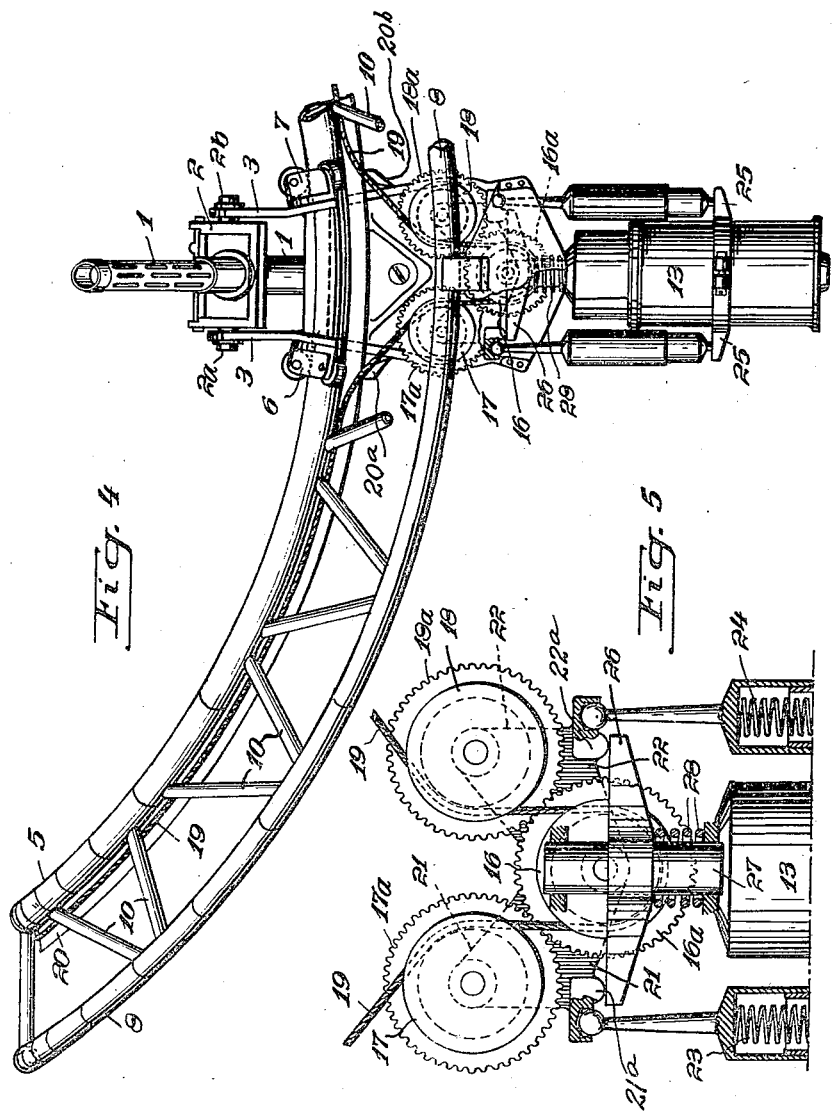

March 12, 1940.   E. BLATTMANN   2,193,547
GUN MOUNT FOR VEHICLES OR AIRCRAFT
Filed April 7, 1937     5 Sheets-Sheet 3
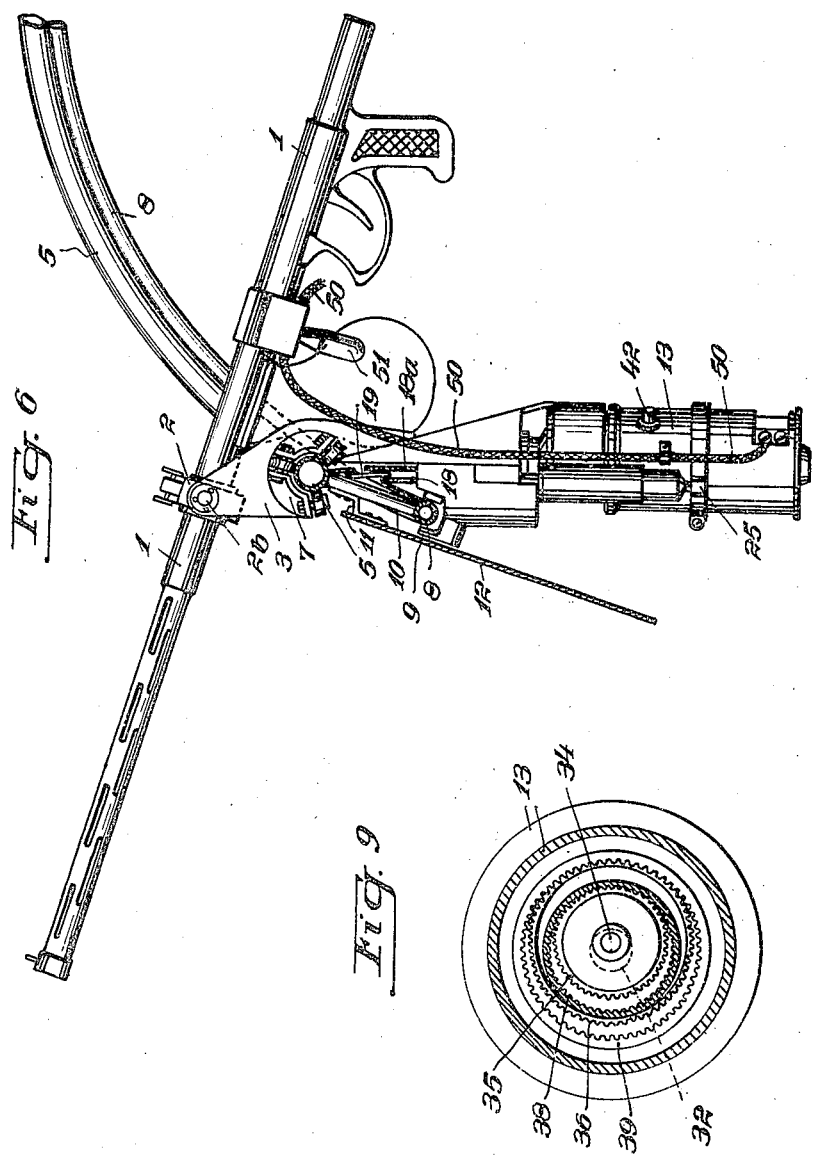

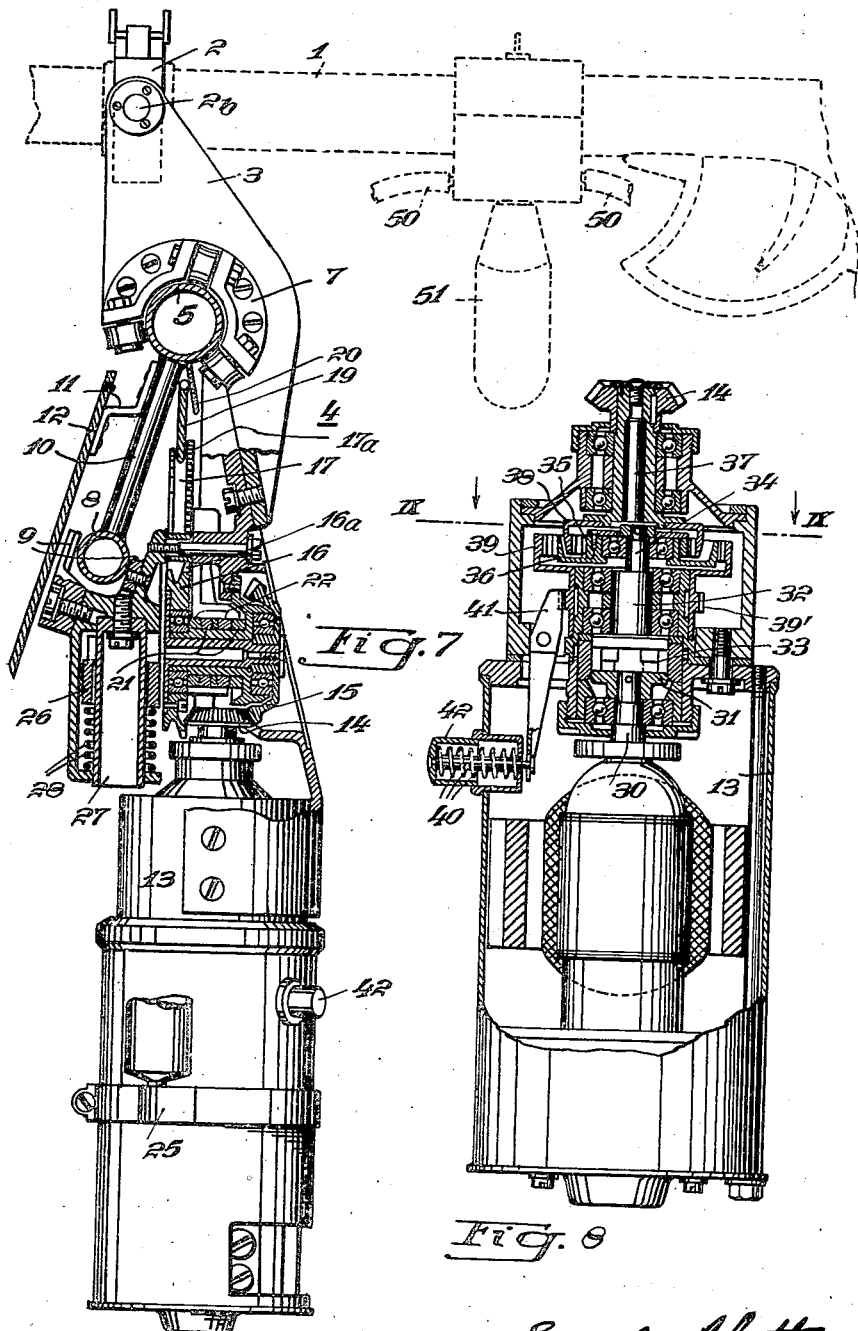

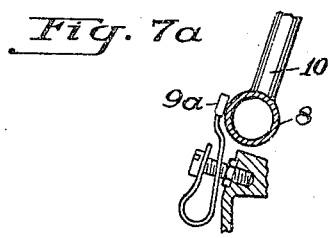
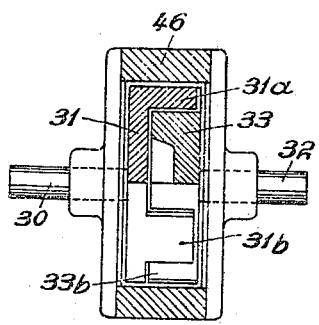
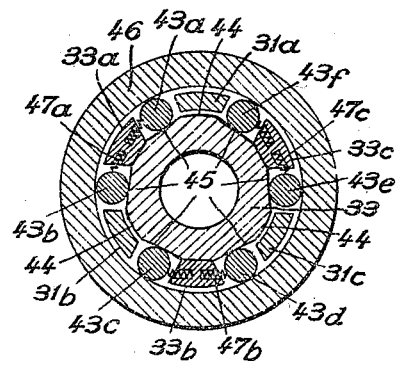

Patented Mar. 12, 1940

2,193,547

UNITED STATES PATENT OFFICE 2,193,547

GUN MOUNT FOR VEHICLES OR AIRCRAFT

Eugen Blattmann, Berlin-Steglitz, Germany, assignor to Siemens Apparate und Maschinen Gesellschaft mit beschränkter Haftung, Berlin, Germany, a corporation of Germany Application April 7, 1937, Serial No. 135,381
In Germany April 9, 1936

4 Claims. (Cl. 89—37.5)

This invention relates to a gun mount for vehicles and particularly for aircraft equipped with a gun support, movable along a—preferably closed—path. When employing gun mounts of this type conditions are often such that, when shifting the gun support along its path, part of the range of fire which can be covered by the gun in a plane perpendicular to the path in question cannot be utilized, owing to existing obstructions, e. g. parts of the craft, etc.

To facilitate understanding we take the case of a gun mount provided on top of an aircraft diagrammatically illustrated in Figs. 1 to 3 of the drawings, which represent an elevation, a top view, and a transverse section of an aircraft equipped with a gun mount according to the invention. As a rule, the body of the aircraft is of approximately elliptical cross-section at the point where the gun mount is to be arranged, as is shown in Fig. 3. If the types of gun mounts hitherto known were used in this case, the following difficulties would arise: the gun support could, for instance, be fixed so that at point $a$ of the path marked in Fig. 2, the lower side of the arc of fire $\beta$ which can be covered by the gun in a plane perpendicular to the gun support path in question, runs tangentially to the body of the airplane, as is illustrated in Fig. 3. With the gun support in a corresponding position on its path it would consequently be possible to fire laterally at an inclined downward angle. If it desired to fire straight ahead the gun support would have to be shifted in Fig. 2 to point $b$ of the path. The position of the arc of fire $\beta$ covered by the gun relative to the airplane would then be as illustrated in Fig. 1. It will be seen that the body of the airplane prevents utilizing section $\phi$ of the arc of fire. With the gun support at point $b$ the arc of fire of the gun would therefore be decreased by part $\phi$.

The invention eliminates these drawbacks in a manner extremely advantageous also from a constructional point of view, viz., by deriving from the longitudinal displacement of the gun support a tilting movement in a plane which is perpendicular to the path in question.

In case a gun mount according to the invention is used, the gun support, if shifted for instance from point $a$ to point $b$ of its path, is therefore automatically tilted so that the lower vector of the gun firing range arc is always tangential with the surface of the airplane body, with the result that also with the gun support at point $b$ of its path the maximum gun firing range arc can be utilized.

In the above description a further characteristic of the invention is mentioned which, if required, could be utilized by itself, viz., that from the longitudinal displacement of the gun support there is also derived a movement perpendicular to the path or to the projection plane of the path. It becomes therefore possible, as indicated in Figs. 1 to 3, to adapt the path of the gun support exactly or essentially to the curves of the surface of the airplane.

With regard to the details described below the following should be noted.

A gun mount has become known, using on the one hand for fixing and guiding the gun merely a manually displaceable carriage guided by means of rollers along a rod with circular cross section forming a plane semi-circle, and, on the other hand, a straight rail connected at one end with the carriage and on the other end with the foundation by means of a ball joint, at a point which is outside the plane of aforementioned semi-circular rail, in the geometrical axis of this rail. Naturally, the gun support does in this case not perform a tilting movement in a plane perpendicular to the path.

It is further known that in connection with gun mounts a drawing rope can be used instead of a draw rod for adjusting the gun. In the example to be described according to the present invention a rope drive is employed, in the case of which,—contrary to the known arrangement— a driving wheel of a carriage serving for carrying the gun runs down along a rope which is practically motionless.

An example for a gun mount mounted upon the top of the fuselage of an aircraft and designed in accordance with the invention is represented in the drawings.

In the accompanying drawings:

Fig. 1 is a side elevation,

Fig. 2 is a top view,

Fig. 3 is a cross-section of an aircraft provided with the new gun mount,

Fig. 4 is an enlarged elevational view of the gun mount, showing a portion of the guide track, Fig. 5 is a part of the same view as in Fig. 4 on still larger scale, Fig. 6 is a side elevation of the gun mount with the track shown in transverse section.

Fig. 7 is an enlarged side elevation of the gun mount similar to Fig. 6, Fig. 7 showing the upper portions of the mount in sectional elevation, Fig. 7a is a modified form of the fork 9—9 in Fig. 7.

Fig. 8 is a sectional elevation of the lower portion of Fig. 7, containing the motor and the drive gear, Fig. 9 is a transverse section through the gear casing on line IX—IX of Fig. 8, and Figs. 10 and 11 represent respectively in longitudinal central section and in transverse section and in enlarged scale the details of the non-reversible clutch 33 of Fig. 8.

The gun is supported in the usual manner in a vertical axis of rotation by means of two trunnions (not shown) provided in a frame 2, which on its part can be swivelled on a horizontal axis on the gun support 3 by means of trunnions 2a and 2b. The trunnions mentioned first enable the gun 1 to be swivelled within certain limits against the plane of frame 2 around an axis which is perpendicular to the axis through trunnions 2a and 2b. The gun support forms part of a carriage 4, which can be moved along a guide track. In the case described herein, this track consists of a hollow rod 5 having a circular cross-section, and being adapted to the curved surface of the airplane body, as shown in Figs. 1 to 3, 4 and 6. The desired shape of the track rod 5, can for instance, be obtained by manufacturing first a plane circular ring, which is then bent to the desired shape on a template which corresponds to the shape of the cockpit rim. In this way it is ensured that the track 5 receives the proper form. For moving the carriage 4 along track 5 there are employed in the present case two sets 6 and 7 of three rollers each, which are displaced against each other by about 120° over the rod profile (cf. Figs. 4, 6 and 7).

To ensure the aforementioned tilting movement of the gun support in dependence on the displacement along its path, there is also provided a guide rail 8 consisting of a rod which, in the present case, is likewise hollow. Its shape can be seen from Figs. 1 to 3, 4, 6, and 7. This guide rail can be manufactured in the same manner as guide track 5. The basic shape (plane circular ring) of the guide rail 8, however, has a larger diameter than the corresponding basic shape of the guide track 5, as will also be seen from the drawings. The guide rail 8 is embraced by a fork 9 connected with the carriage 4. To compensate small irregularities it would, of course, be possible to make one of the prongs of the fork resilient as shown in Fig. 7a; this spring would in this case be designed so that the two prongs of the fork always bear against guide rail 8.

The guide track 5 and guide rail 8 are rigidly connected with each other by means of bracing rods or struts 10. As indicated in Figs. 6 and 7, this unit, which consists of parts 5, 8 and 10, can be connected with the outer surface 12 of the airplane body by means of Z-shaped brackets 11. It is, of course, also possible to provide in addition braces etc.

The operation of the parts described so far is easy to understand. If the carriage is shifted from point a of its path (Figs. 4, 6, 7) to point b (Figs. 1 and 2), the carriage is tilted in a vertical plane to the path in question, as will be readily seen from Fig. 4; the result is that the lower side of the arc of fire in this plane is tangential to the surface of the airplane at the point of path in question, and the gun can be fired at a higher angle of elevation.

The operator is within the cockpit surrounded by guide track 5. The aforementioned tilting movement of the gun support in dependence on the displacement along its path also offers considerable advantages for the operator of the gun, viz.:

At the lowest point of the path of the gun support (point a, cf. Figs. 1 to 3) it is necessary to swing out as far as possible, i. e., the rear part of the gun must be lifted considerably in order to bring the gun to the lower limit of the range which can be covered. As in this case the gun support is at the lowest point of its path, there will be no difficulties in the operation of the gun. Vice versa, it is necessary to lower the rear part of the gun to adjust it to the upper limit of its range of fire, if the gun is at the highest point of its path (point b, cf. Figs. 1 to 3 and 4). In view of the fact, however, that in this case the gun support is at the highest point of its path, no difficulties will be experienced also in this position.

The moving of the gun along track 5 could, if required, be effected manually, for example in conjunction with a locking device for the gun support or carriage 4 respectively, so that by the above-described devices the purpose of the invention is already fulfilled.

In the preferred type of design, however, a motor drive is provided for the gun, as is also shown in the drawings. Motor 13, which is preferably of the reversible type, forms part of the carriage 4, or it is attached to carriage 4 as shown in Figs. 6 and 8. The motor shaft is coupled via a gearing, described below, with a bevel wheel 14, which on its part acts upon a rope pulley 16 via bevel wheel 15. An endless rope 19, which rests on a rim 20 connected with the guide track 5 runs over these gears as well as two tension pulleys 17 and 18, which serve simultaneously also as driving pulleys. Guide plates 20a and 20b guide the rope respectively onto pulleys 17 and 18. The shape of the rim will be seen from Figs. 4 and 7, from which it will be noted that rim 20 forms with the struts V-shaped recesses into the bottoms of which rope 19 comes to lie when it is drawn taut. Since rim 20 in most places (except in the position Fig. 7) is outwardly inclined, rope 19 cannot fall out of these recesses. The two tension pulleys 17 and 18 are each journalled on a lever 21, 22, respectively, which levers in turn are pivotally mounted on a common axis which coincides with the axis of rotation of the rope pulley 16. Each of these levers is acted upon by a compression spring arrangement 23, 24 respectively. These pressure springs are supported at their opposite ends by a cross-rail 25 provided at the motor housing, one ball bearing being provided at each side. In order to be able to use tension pulleys 17 and 18 simultaneously as driving pulleys, they are coupled with a gear 16a on the rope pulley 16 via gearings 17a, 18a respectively (see Fig. 5). A cross head 26, which bears against the levers 21 and 22, is guided without considerable play on a rod 27 fixed to the carriage. This crosshead is pressed by means of a relatively weak spring 28 against lips 21a, 22a of the levers 21 and 22.

The purpose of parts 26 to 28 will be realized when imagining the arrangement described without these parts. If in this case the motor were switched on so that the carriage in Fig. 4 starts moving to the right, the running-on side of the rope would be tensioned, whereas the other side would remain slack. In this case the tension pulley arm 22 would yield downwardly, and disturbances would occur in the operation. These are eliminated by parts 26 to 28. For, if a one-sided tension is exerted, i. e., if for instance rope pulley 18 and lever 22 supporting the same try to yield downwardly, cross head 26 will jam edgewise on guide rod 27 in consequence of the one-sided action of the force in question upon guide rod 27; the cross head will then remain locked on rod 27 as long as a one-sided force is exerted, i. e., tension pulley 22 is prevented from yielding. On the other hand, parts 26 to 28 do not impair the desired effect of tension pulleys 17 and 18. In short, the above-described device ensures that the rope 19 is at all times well tensioned.

The aforementioned gearing between motor 13 and bevel wheel 14 is provided with a self-locking gearing, series connected with a coupling which can be released manually. The self-locking gearing ensures that after the motor has been switched off the gun support remains in the position reached at that moment and is not displaced either by the dead weight of the parts connected to it, or by its own weight. A series-connected coupling, which can be released manually, enables the operator to displace the carriage 4 even if the electric drive cannot be operated due to a breakdown of the current source, or for other reasons. By the provision of this gearing, the advantages of an automatic adjustment of the gun support are thus combined with the reliability of operation offered by the manual adjustment. In order to save as much space as possible, a differential gearing, which in the present case, could also be called a two-way gearing, has been used in place of the coupling released by hand.

I shall now describe, with reference to Figs. 8 through 11, the details of the gearing between the driving motor and the rope sheaves. Coupled with the motor shaft 30 is a disc 31 which carries several, in this case three, axially extending claws 31a, 31b, 31c, which are spaced apart 120 degrees relatively to one another and which overlap peripherally the cammed disc 33. This disc is provided on its periphery with radially extending lugs 33a, 33b and 33c, which are located in the spaces between the aforementioned claws 31a, 31b, 31c. Disc 33 is rigidly attached to the driven shaft 32. In the spaces between claws 31a—31c and the lugs 33a—33c are disposed loose rollers 43a—43f in such manner that each roller is bounded on one side by one of the claws 31a—31c, and on the other side by one of the lugs 33a—33c. The cammed disc 33 is alternately provided on its periphery with true cylindrical peripheral portions 44 and cam-shaped portions 45 inclined with respect to the cylindrical periphery, these cam-shaped portions alternating in the direction of pitch with respect to the periphery such, for instance, that in Fig. 11 the cylindrical peripheral portion 44 at the top is bounded by the two cam-shaped peripheral portions 45 slightly inclining from this top portion 44 toward the center of disc 33. The cam-shaped portions 45 following the two last-mentioned cam-shaped portions 45 are inclined the other way, etc. The aforementioned rollers 43a—43f rest against these cam-shaped portions of disc 33. The aforementioned structure is surrounded by a stationary ring 46 of such an inner diameter that the rollers 43a—43f are just free when the rollers are at the low end of the appertaining cam-shaped peripheral portion, whereas when they are forced up toward the high end of the cam-shaped portion they will jam between the periphery of disc 33 and the outer ring 46 in a manner similar to the arrangement conventional in a so-called overrunning clutch. Furthermore, the cylindrical peripheral portions 44 of disc 33 are respectively radially alined with the claws 31a—31c. Besides, each lug 33a—33c has provided on both sides compression springs 47a—47c, which tend to push rollers 43a—43f respectively away from lugs 33a—33c.

The operation of this self-locking coupling is as follows. Assuming that in Fig. 11 the shaft 30, to which claws 31a—31c are fixed, should revolve in clockwise direction, then the claws 31a—31c would press against the rollers which are located at the leading ends of these claws. If the shaft 30 should rotate counterclockwise, claws 31a—31c would press against the appertaining rollers located at the other end of the claws. In both cases, the rollers encountered will be pushed against their appertaining radial lugs 33a—33c whereby the disc 33 and thus the driven shaft 32 are taken along. If, on the other hand, the driven shaft 32 should be rotated in one or the other direction independent of shaft 30, three of the six rollers 43a—43f, in accordance with the direction of revolution, are pressed by the appertaining springs 47a—47c, attached to these lugs, towards the high ends of the appertaining cam surfaces which causes these rollers to jam between ring 46 and disc 33 so that disc 33 and thus shaft 32 become locked. The greater the torque which is exerted upon shaft 32, the tighter the rollers will lock. Thus disc 33 is immediately arrested at any attempt to rotate shaft 32 independently of shaft 30, while the driving shaft 30 can freely rotate disc 33 and driven shaft 32 in either direction.

The transmitting shaft of the self-locking gearing 32 is coupled with one side of a planet gear, the wheels of which engage with each other. A section of this planet gear is shown in Fig. 9. 34 is an eccentric pin carried at the end of shaft 32 (Fig. 8). The two interconnected wheels 35 and 36 are mounted on this eccentric pin by means of a ball bearing. The first of these two wheels is provided with an external toothing, which engages with the internal toothing of a wheel 38 connected to transmitting shaft 37. Wheel 36 has an external toothing, which engages with the internal toothing of wheel 39. This wheel is journalled on a part rigidly connected with the housing, and is provided at its lower part with a rim of teeth 39', with which a dog 41 engages due to the action of spring 40, so that normally wheel 39 is locked. The aforementioned shaft 37, which is connected with wheel 39, carries the bevel wheel 14 which drives the rope gear as aforedescribed. A push-button 42 serves for the operation of holding dog 41 in engagement with teeth 39'.

The operation is as follows: Motor 13 is switched in and acts upon shaft 32. As soon as the eccentric pin 34 is rotated, wheel 36 rolls on to the stationary wheel 39. The rotary motion of wheel 36 around eccentric pin 34 thus produced is also transmitted to wheel 35, which is connected with wheel 36. As mentioned before, this wheel acts upon bevel wheel 14 connected with shaft 37. On stopping the motor all parts remain in the position reached at that moment, as due to the action of the self-locking gearing 30 to 33 the dead weight of the gun support etc. cannot cause a displacement of the parts.

Should it be desired, however, to move the gun support along track 5 without making use of drive 13, dog 41 is disengaged from wheel 39' by push button 42 against the action of spring 40. In this condition the motion transmitted to the gearing by way of gear 14 when the gun support 3 is displaced, is transmitted without resistance to the idle running wheel 39. The operator is thus able at all times to shift the gun support 13 by hand if motor 13 should break down or be destroyed.

The electric current is supplied to the motor 10 through cable 50, which can for instance be connected to a socket at the bottom of the gun mount by means of a plug. As illustrated in Fig. 6, the cable is provided with a switch 51 (not shown in detail) which is attached to the gun 1; the handle of this switch is thrown over to the right or to the left, transversally to the gun 1, if the motor is to be switched in for clockwise or counterclockwise rotation.

The operation of the entire arrangement is extremely simple. The operator holds the gun with the right hand, whereas his left hand rests on the handle 51, so that he is in a position to move the gun support 3 and its carriage 4 to any desired point of guide track 5, without interrupting the operation of the gun 1. If the motor drive fails to work for one reason or other carriage 41, including the parts attached to it, can be shifted by hand along guide track 5 on depressing push button 42.

Although it is of great advantage to use a closed track for the gun support, it is possible to utilize the invention also if this condition is not fulfilled; it would for instance be possible to construct a gun mount in which the track would merely extend from about point a to point b (cf. Figs. 1 to 3), or over the double length of this distance.

In the case described herein the idea of the invention has been used to shift the lower arc portion of the gun fire range in a plane which is vertical to the track in question so that the lowermost gun position becomes tangential to the surface of the airplane at the different points of the track. In case the vehicle or aircraft should be provided with superstructures etc. or if it should appear to be advisable for other reasons, it is of course possible to adapt the automatic tilting movement of the gun support along its track to the particular prevailing conditions in the manner aforedescribed.

What I claim is:

1. Gun mount for craft having a cockpit, particularly for aircraft, including a supporting structure on the craft surrounding the cockpit and consisting of a running rail of circular cross section and a guide rail extending in parallel to said running rail but spaced a suitable distance therefrom, the connecting line between said rails located in a plane at right angles to said rails being directed at each point of the rail path in the direction of the outer craft contour appearing in said plane, a gun carriage having a set of rollers contacting with said running rail and spaced around said rail over an angle more than 180° for longitudinally movably and rotatably supporting said carriage on said rail, and a fork on said carriage engaging said guide rail to positively tilt said carriage at each point of its path commensurate with the direction of the adjacent craft contour portion at said point, so that the lower vector of the range-of-elevation angle of the gun forms a tangent to the wall of the craft at said point, a stationary pull rope supported on said running rail, a driving sheaf on said carriage engaged by said rope and means on said carriage for driving said sheaf to move the carriage along said rail.

2. Gun mount for craft having a cockpit, particularly for aircraft, including a supporting structure on the craft surrounding the cockpit, and a gun carriage movably disposed on said structure along its path, said supporting structure having means for positively tilting said carriage at each point of said path in a plane at right angles to the direction of the path at said point to a desired angle to adapt the range-of-elevation angle of the gun to the contour of the craft in a transverse plane at said point, a stationary pull rope supported on said structure, a driving sheaf and two individually movable tension sheaves journalled on said carriage and geared together and between which said rope is looped, tension means acting upon said tension sheaves for normally keeping the rope loop taut, and locking means for preventing the individual movement of one tension sheaf alone to tighten the rope in case of a slack, and a motor on said carriage for driving said sheaves to move the carriage along said structure.

3. Gun mount for craft having a cockpit, particularly for aircraft, including a supporting structure on the craft surrounding the cockpit, and a gun carriage movably disposed on said structure along its path, said supporting structure having means for positively tilting said carriage at each point of said path in a plane at right angles to the direction of the path at said point to a desired angle to adapt the range-of-elevation angle of the gun to the contour of the craft in a transverse plane at said point, a stationary pull rope frictionally clamped on said structure, a driving sheaf stationarily journalled on said carriage and two tension sheaves, and two carrier arms on which said tension sheaves are respectively journalled and which have a common pivot on the rotation axis of said driving sheaf, said rope being looped between said three sheaves, a compression spring for each tension sheaf tending to maintain the rope loop taut, a crosshead yieldingly and loosely slidingly supported on said carriage midway between its ends and disposed to engage with each of its ends one of said sheaf arms, so that in case one sheaf arm tends to yield alone in case of one-sided rope tension, said crosshead jams on its support due to one-sided pressure and prevents said arm from yielding to the one-sided tension and from slackening the rope loop, said driving and tension sheaves being geared together, and a motor on said carriage for driving said driving sheaf.

4. Gun mount for craft having a cockpit, particularly for aircraft, including a supporting structure on the craft surrounding the cockpit, and a gun carriage movably disposed on said structure along its path, said supporting structure having means for positively tilting said carriage at each point of said path in a plane at right angles to the direction of the path at said point to a desired angle to adapt the range-of-elevation angle of the gun to the contour of the craft in a transverse plane at said point, a pull rope for said carriage extending along said supporting structure and V-shaped clamping means disposed along said structure in which the portions of said rope not engaged by the carriage are normally frictionally held, a driving sheaf stationarily journalled on said carriage and two tension sheaves, and two carrier arms on which said tension sheaves are respectively journalled and which have a common pivot on the rotation axis of said driving sheaf, said rope being looped between said three sheaves, a compression spring for each tension sheaf tending to maintain the rope loop taut, a crosshead yieldingly and loosely slidingly supported on said carriage midway between its ends and disposed to engage with each of its ends one of said sheaf arms, so that in case one sheaf arm tends to yield alone in case of one-sided rope tension, said crosshead jams on its support due to one-sided pressure and prevents said arm from yielding to the one-sided tension and from slackening the rope loop, said driving and tension sheaves being geared together, and a motor on said carriage for driving said driving sheaf.

EUGEN BLATTMANN.